United States Patent [19]

Narumiya

[11] 4,258,099
[45] Mar. 24, 1981

[54] CORDIERITE, ALUMINA, SILICA POROUS CERAMIC BODIES COATED WITH AN ACTIVATED ALUMINA LAYER

[75] Inventor: Tsuneaki Narumiya, Yokohama, Japan

[73] Assignee: Bridgestone Tire Company Limited, Tokyo, Japan

[21] Appl. No.: 87,183

[22] Filed: Oct. 22, 1979

[30] Foreign Application Priority Data

Oct. 21, 1978 [JP] Japan ................. 53-129785

[51] Int. Cl.$^3$ .................. B32B 5/18; B32B 3/26
[52] U.S. Cl. .................. 428/311; 106/40 R; 106/41; 106/62; 75/68 R; 75/93 R; 210/506; 210/510; 210/773; 252/455 R
[58] Field of Search ............ 428/311, 310, 539; 106/40 R, 41, 62; 210/510, 69, 506; 75/68 R, 93 R; 252/455 R

[56] References Cited

U.S. PATENT DOCUMENTS

| | | | |
|---|---|---|---|
| 3,893,917 | 7/1975 | Pryor et al. | 210/510 |
| 3,897,221 | 7/1975 | Salyer et al. | 106/40 R |
| 3,947,363 | 3/1976 | Pryor et al. | 106/40 R |
| 3,950,175 | 4/1976 | Lachman et al. | 106/62 |
| 4,001,028 | 1/1977 | Frost et al. | 106/40 R |
| 4,004,933 | 1/1977 | Ravault | 106/40 R |

*Primary Examiner*—O. R. Vertiz
*Assistant Examiner*—Mark Bell

[57] ABSTRACT

A ceramic porous body useful as a filtering material for molten metal is disclosed. The ceramic porous body, consisting essentially of cordierite, alumina and silica, is formed by covering surfaces of cell strands of a ceramic porous body skeleton having a bulk specific gravity of 0.25–0.55 with 3–40% by weight per the weight of the skeleton of an activated alumina layer and has an average diameter of interconnected voids of 0.3–5.0 mm, a pressure loss of 0.3–30.0 mm as a water-gauge pressure when passing air through the body of 1 cm thick at a rate of 1 m/sec., a microsurface area of not less than 10 m$^2$/g and a porosity of 75–95%.

3 Claims, 4 Drawing Figures

CORDIERITE, ALUMINA, SILICA POROUS CERAMIC BODIES COATED WITH AN ACTIVATED ALUMINA LAYER

The present invention relates to ceramic porous bodies useful as a filtering material for molten metal such as molten aluminum and the like, and more particularly to ceramic porous bodies having excellent properties as a filtering material for molten metals to be used in the manufacture of mold members requiring a high mechanical strength, metal plates or foils having fewer pinholes and the like.

Recently, the material of parts such as engine and the like requiring a high mechanical strength is converted from iron steel to aluminum in view of energy-saving and weight-saving. Further, there is largely increased a demand for aluminum foils or thin sheets with a thickness of from few microns to several hundred microns as a packaging material for food and drink, and metal fine wires for electrical conductor such as copper wires and the like with a diameter of from few microns to several ten microns. However, these metal articles are strongly required to have a high quality. Therefore, if solid impurities and molten impurities such as hydrogen, sodium and the like are existent in a cast product for the manufacture of the metal article, it is necessary to completely remove these impurities from molten metal because they considerably degrade the quality of the metal article.

Since the metal cast product has usually been produced by filtration of molten metal, there has hitherto been practised a method of removing such impurities from molten metal at two step process, which comprises a first step of passing molten metal through a bed filter made of alumina balls with a diameter of several millimeters or alumina sintered body to remove solid impurities therefrom and a second step of removing unfiltered inclusions such as molten impurities of hydrogen, sodium and the like by chemical procedure or physical adsorption procedure.

However, such a two step process is very troublesome in its operation and has a drawback that the impurities cannot be removed efficiently. Furthermore, the bed filter using the alumina ball is suitable for the removal of coarse solid impurities, but is insuitable for the removal of microfine solid impurities. On the other hand, the use of the alumina sintered body can remove the microfine solid impurities, but a long filtering time is taken due to the large pressure loss and as a result, the productivity is very low. In any case, it is difficult to surely and efficiently remove the microfine solid impurities and molten impurities from molten metal by the conventional method.

The present invention is to solve the above mentioned drawbacks of the prior art and to provide ceramic porous bodies having very favorable properties as a filtering material for molten metal, which can perform the removal of solid impurities and molten impurities in molten metal at one step so as to surely and efficiently remove these impurities from molten metal.

Under the above circumstances, the inventor has made various studies with respect to an improvement of the prior art and as a result, the present invention has be accomplished. That is, the present invention is the provision of a ceramic porous body useful as a filtering material for molten metal and having a three-dimensionally network cellular structure with a plurality of interconnected voids without clogging in any directions, characterized in that said ceramic porous body is formed by covering surfaces of cell strands of a ceramic porous body skeleton having a bulk specific gravity of 0.25–0.55 with 3–40% by weight per the weight of the skeleton of an activated alumina layer, and has an average diameter of the interconnected voids of 0.3–5.0 mm, a pressure loss of 0.3–30.0 mm as a water-gauge pressure when passing air through the body of 1 cm thick at a rate of 1 m/sec., a microsurface area of not less than 10 $m^2/g$, and a porosity of 75–95%.

In the ceramic porous body according to the present invention, microfine solid impurities can efficiently be filtered from molten metal by limiting the bulk specific gravity of the skeleton, amount of activated alumina layer applied, average diameter of interconnected voids, pressure loss, microsurface area and porosity to the above defined ranges, respectively, while the molten impurities such as hydrogen, sodium and the like can surely be removed from molten metal by adsorbing them on the activated alumina layer. That is, the ceramic porous bodies according to the present invention satisfy the performance capable of surely removing these impurities and the performance capable of efficiently conducting the removal operation of the impurities. Therefore, the ceramic porous bodies are very useful as a filtering material for molten metal to be used in the manufacture of mold members requiring a high mechanical strength, metal plates or foils having little defect such as pinholes, and the like.

The present invention will now be described in greater detail with reference to the accompanying drawings, wherein.

Figure 1:
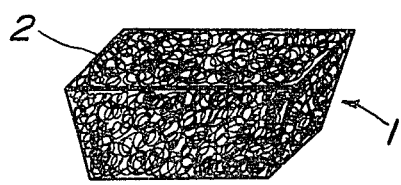
FIG. 1 is a perspective view of an embodiment of the ceramic porous body according to the present invention.
Figure 2:
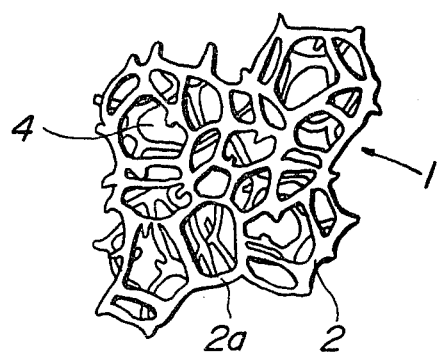
FIG. 2 is a partly enlarged side view of the embodiment shown in FIG. 1.
Figure 3:
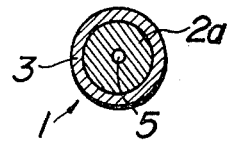
FIG. 3 is an enlarged sectional view of a cell strand in the ceramic porous body according to the present invention.

In FIG. 1 is shown a sketchy outline of a ceramic porous body 1 used as a filtering material for molten metal according to the present invention. The ceramic porous body 1 is obtained by adhering a ceramic slurry to an open-cell, flexible polyurethane foam as a substrate, firing it to carbonize and remove the foam to thereby form a ceramic porous body skeleton 2, and applying an activated alumina layer 3 over whole surfaces of cell strands 2a of the skeleton 2. The thus obtained ceramic porous body 1 has substantially the same three-dimensionally network cellular structure as that of the foam, wherein a plurality of interconnected voids 4 are existent therein without clogging in any directions (as shown in FIG. 2), and is shaped into a frustum of an inverted quadrangular pyramid as a whole. As shown in FIG. 3, a continuous cavity 5 corresponding to the shape of the foam is formed inside the cell strands 2a of the skeleton 2. Moreover, the interconnected voids 4 constitute flow paths for molten metal.

In the ceramic porous body 1 of the above mentioned structure according to the present invention, the skeleton 2 has a bulk specific gravity of 0.25–0.55, and the activated alumina layer 3 is applied to the surfaces of cell strands 2a of the skeleton 2 in an amount of 3–40% by weight per the weight of the skeleton 2. By limiting the bulk specific gravity of the skeleton 2 and the amount of the activated alumina layer 3 to the above defined ranges, there can be obtained ceramic porous bodies 1 having higher mechanical and thermal strengths, which are sufficient in the durability as the filtering material for high temperature molten metal and excellent in the performance of favorably and efficiently removing the solid and molten impurities.

When the bulk specific gravity of the skeleton 2 is less than 0.25, the reinforcing effect of the activated alumina layer 3 formed on the surfaces of cell strands 2a of the skeleton is poor, so that the resulting ceramic porous body 1 cannot sufficiently withstand to a hot load during the filtration of molten metal, while when the bulk specific gravity is more than 0.55, it is difficult to apply the activated alumina layer 3 without clogging. Furthermore, when the amount of the activated alumina layer 3 applied is smaller than 3% by weight per the weight of the skeleton 2, the adsorptivity to the molten impurities is poor, so that the removal of the molten impurities is frequently unsatisfactory, while when the amount is more than 40% by weight, the clogging is caused.

According to the present invention, the ceramic porous body has a three-dimensionally network cellular structure with a plurality of interconnected voids without clogging substantially in any directions and is characterized by having an average diameter of the interconnected voids 4 (molten metal flow path) of 0.3–5.0 mm, a pressure loss of 0.3–30.0 mm as a water-guage pressure when passing air through the body of 1 cm thick at a rate of 1 m/sec. [measured according to a second test defined by Japanese Air Cleaning Associate (JACA No. 10)], a microsurface area of not less than 10 $m^2/g$ after the application of the activated alumina layer, and a porosity of 75–95%. When such a ceramic porous body 1 is used as a filtering material for molten metal, it can efficiently and surely remove the microfine solid impurities of about few microns and the molten impurities, which have never been removed by the simple filtration operation of the prior art.

When the average diameter of the interconnected voids is less than 0.3 mm, it is very difficult to pass molten metal through the ceramic porous body and particularly, the capacity of holding the solid impurities considerably lowers, while when the average diameter is more than 5.0 mm, the capacity of removing the solid and molten impurities considerably lowers. Further, when the pressure loss is lower than 0.3 mm or when the porosity is more than 95%, the filtering performance against the impurities lowers, while when the pressure loss is higher than 30.0 mm or when the porosity is less than 75%, the filtering velocity becomes considerably slower. Moreover, when the microsurface area is less than 10 $m^2/g$, the molten impurities may not surely be removed. In any case, when the average diameter, pressure loss, porosity and microsurface area are outside the above defined ranges, there cannot be achieved both the performance of surely removing the impurities and the performance of efficiently conducting the filtration operation, which are aimed at the present invention.

As a substrate for the formation of the ceramic porous body skeleton 2, it is preferable to use a polyurethane foam having a skeletal reticulated structure wherein all of cell membranes are completely removed by heat, a chemical or the like. Further, the material of the skeleton 2 formed by adhering a ceramic slurry to the foam is alumina phase, or preferably cordierite phase in view of thermal shock resistance and anticorrosive resistance.

The formation of the activated alumina layer 3 covering the cell strands 2a of the skeleton 2 is carried out by covering the skeleton 2 with a mixed slurry of $\beta$-, $\gamma$- or $\delta$- activated alumina raw material and a slight amount of a binder such as colloidal silica and then activating it. In this case, it is preferable to use $\gamma$-alumina as the alumina raw material because molten metal to be filtered is in the elevated temperature state.

Figure 4:
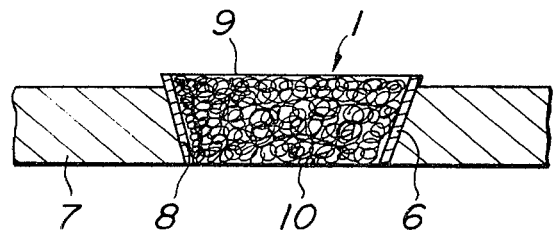
FIG. 4 is a longitudinal sectional view of an embodiment using the ceramic porous body according to the present invention as a filtering material for molten metal.

When the ceramic porous body 1 of the above mentioned structure is used as a filtering material for molten metal, as shown in FIG. 4, all of side surfaces of the body 1 is covered with a ceramic sheet 6, if necessary, and then the body 1 is fitted in a hole 8 having a frustum of an inverted quadrangular pyramid, which being formed in a support 7. In FIG. 4, molten metal such as molten aluminum or the like is passed from an upper surface 9 of the body 1 into the interconnected voids 4 thereof, during which the solid and molten impurities are simultaneously removed from molten metal at one step operation, and then flowed out from a bottom surface 10 of the body 1. (Moreover, molten metal may be flowed from a small size surface of the body to a large size surface thereof by giving a head difference of molten metal, which is opposed to the case of FIG. 4.)

As described above, the filtering material for molten metal (or ceramic porous body 1) according to the present invention is formed by applying 3–40% by weight of the activated alumina layer 3 to the surfaces of cell strands 2a of the ceramic porous body skeleton 2 having a bulk specific gravity of 0.25–0.55 and is characterized by having an average diameter of interconnected voids of 0.3–5.0 mm, a pressure loss of 0.3–30.0 mm as a water-gauge pressure when passing air through the body of 1 cm thick at a rate of 1 m/sec., a microsurface area of not less than 10 $m^2/g$ and a porosity of 75–95%, so that the pressure loss in the filtration is suppressed to a minimum value, while when molten metal passes through the flow path of the filter (interconnected voids 4), the molten impurities are surely removed by efficiently contacting with the activated alumina layer 3 due to good self-stirring, during which the microfine solid impurities are also caught surely. Further, according to the present invention, molten metals such as aluminum, copper and the like can rapidly and productively be filtered at a linear filtering velocity of 10–300 cm/min. That is, the present invention makes it possible to efficiently remove both the solid and molten impurities only by passing molten metal through the interconnected voids 4 of the ceramic porous body 1, so that it is not necessary to conduct the removal of the solid and molten impurities at separate steps.

As mentioned above, the ceramic porous body 1 according to the present invention possesses a performance of surely removing the microfine solid impurities, a performance of surely removing the molten impurities such as hydrogen, sodium and the like, and a performance of efficiently conducting the removal of these impurities with a small pressure loss at once when using as a filtering material for molten metal, so that the removal of the impurities from molten metal becomes simple and inexpensive. Moreover, cast products of molten metal filtered by using the ceramic porous body 1 according to the present invention have a high quality because the solid and molten impurities are surely removed as mentioned above, so that they are preferably suitable for the manufacture of mold members requiring high strength, foils, plates and wires, which have less surface and internal defects, and the like.

The ceramic porous body 1 according to the present invention is very high in the mechanical and thermal strengths, so that it can surely withstand to thermal shock when the body is preheated up to a temperature of molten metal to be filtered or during the filtration.

The following examples are given in illustration of the invention and are not intended as limitations thereof.

EXAMPLE 1

As a substrate was provided a skeletal reticulated flexible polyurethane foam having a frustum of quadrangular pyramid wherein an upper surface is a square of 611×611 mm, a lower surface is a square of 577×577 mm and a height is 53 mm.

In an agitating tank was charged a powdery mixture of 50 parts of cordierite made by Marusu Yuyaku Co., Ltd. as a trade name K-8 and 50 parts of alumina made by Sumitomo Aluminum Co., Ltd. as a trade name AM-31 together with a liquid mixture of silica sol and water having a mixing ratio of 2:1, and after the resulting ceramic slurry was agitated for about 24 hours, the viscosity was adjusted to 1.5 poises.

The flexible polyurethane foam was impregnated with the ceramic slurry. After the foam was taken out from the slurry, the excess amount of the slurry was removed without deforming the foam. Next, the foam adhered with the slurry was dried at 70° C. for 24 hours and then impregnated with the ceramic slurry having a viscosity of about 0.2 poises. After the removal of excess slurry, the foam adhered with the slurry was dried at 70° C. for 24 hours. The above procedure was repeated 4 times so as to obtain a given bulk density of a ceramic foam after fired. Then, the flexible polyurethane foam covered with the ceramic slurry was fired at about 1,350° C. to obtain a ceramic foam without clogging in any directions.

An activated alumina made by Sumitomo Aluminum Co., Ltd. as a trade name A-11 was dispersed in water containing 15% of silica sol to form an alumina surry having a viscosity of 2 poises. Then, the ceramic foam was thoroughly impregnated with the alumina slurry, dried at 70° C. for 12 hours after the removal of excess slurry and then fired at 600° C. for 1 hour to obtain a ceramic porous body covered with the activated alumina layer and having properties as shown in the following Table 1.

TABLE 1

| Specimen No. | 1 | 2 |
|---|---|---|
| Average diameter of interconnected voids (mm) | 1 | 0.6 |
| Bulk specific gravity | 0.35 | 0.41 |
| Amount of activated alumina applied (wt.%) | 17 | 20 |
| Pressure loss at 1m/sec. (mm aq./cm) | 10 | 25 |
| Porosity (%) | 82 | 80 |
| Microsurface area (m$_2$/g) | >10 | >10 |

EXAMPLE 2

At first, a chamber with a depth of 500 mm was provided in a flow path for molten metal. In the chamber was arranged a flat partition plate having a thickness of 60 mm at a position of 350 mm downward from the upper end of the chamber. At the center of the partition plate was formed a tapered hole having a square of 593×593 mm at its upper surface and an inclination angle of 17.5° with respect to a direction perpendicular to the upper surface. In the hole was fitted each of the specimens through a packing composed of soft asbestos for preventing the floating of the ceramic foam during the filtration of molten metal. Further, the chamber was sufficiently preheated up to a given temperature near the filtering temperature prior to the passing of molten metal. Then, molten metal was supplied into the chamber so as not to directly fall onto the ceramic foam, whereby molten metal passed through the interconnected voids of the ceramic foam from the upside to the downside and flowed out over an output port.

A molten aluminum Alloy 5056 having a sodium content of 0.007% was passed through the chamber in the flow path at a rate of 400 kg/min. to prepare a slab or billets having a diameter of 152 $\phi$. Then, the occurence of surface cracks in the hot rolling and quantities of sodium and hydrogen were measured with respect to the slab, while the number of white spots according to the anodic oxidation process was measured with respect to the billet. The measured results are shown in the following Table 2.

TABLE 2

|  | No filter | Specimen No. 1 | Specimen No. 2 |
|---|---|---|---|
| Surface cracks in the hot rolling | presence | none | none |
| Sodium content (%) | 0.007 | <0.0005 | <0.0005 |
| Hydrogen content (Ncm$^3$/100 g) | 0.4 | <0.1 | <0.1 |
| Number of white spots | 53.3 | 19.6 | 7.1 |

In the above embodiment, the ceramic porous body is shaped into the frustum of the inverted quadrangular pyramid as a whole, but the present invention may be embodied in other forms or carried out in other ways without departing from the scope thereof.

As explained above, according to the present invention, not only molten metal can efficiently be filtered at a linear filtering velocity of 10–300 cm/min. with a small pressure loss, but also the microfine solid and molten impurities can surely be removed at one step. Therefore, the ceramic porous bodies according to the present invention are excellent in the filtering capacity and filterability and useful as a filtering material for molten metal to be used in the manufacture of high quality metal members.

What is claimed is:

1. A ceramic porous body useful as a filtering material for molten metal and having a three-dimensional network cellular structure with a plurality of interconnected voids without clogging in any direction, characterized in that said ceramic porous body is formed by covering surfaces of cell strands of a ceramic porous body skeleton, consisting essentially of cordierite, alumina, and silica, having a bulk specific gravity of 0.25–0.55 with 3–40% by weight per the weight of the skeleton of an activated alumina layer and having an average diameter of said interconnected voids of 0.3–5.0 mm, a pressure loss of 0.3–30.0 mm as a water-gauge pressure when passing air through the body of 1 cm thick at a rate of 1 m/sec., a microsurface area of not less than 10 m$^2$/g, and a porosity of 75–95%.

2. A ceramic porous body as claimed in claim 1, wherein said ceramic porous body skeleton is formed by adhering a ceramic slurry to an open-cell, flexible polyurethane foam as a substrate and firing it to remove the foam by carbonization and has substantially the same skeletal reticulated structure as that of the foam.

3. A ceramic porous body as claimed in claim 1, wherein said activated alumina layer is γ-alumina.

* * * * *